March 26, 1929. W. WUERFEL 1,707,035
PISTON RING
Filed Feb. 15, 1927 2 Sheets-Sheet 1
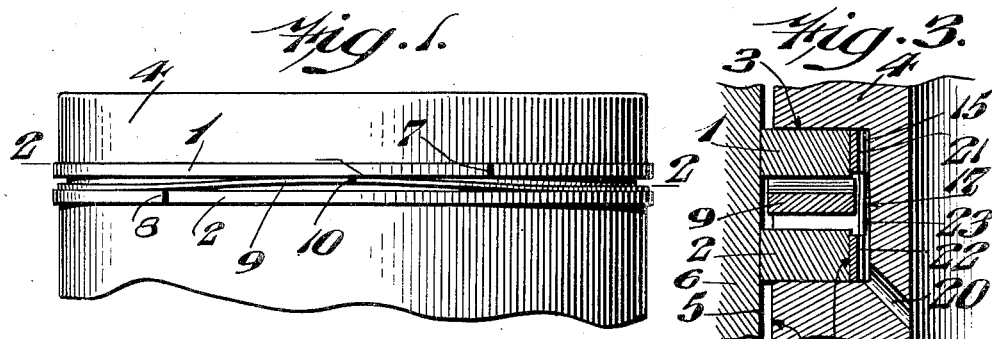
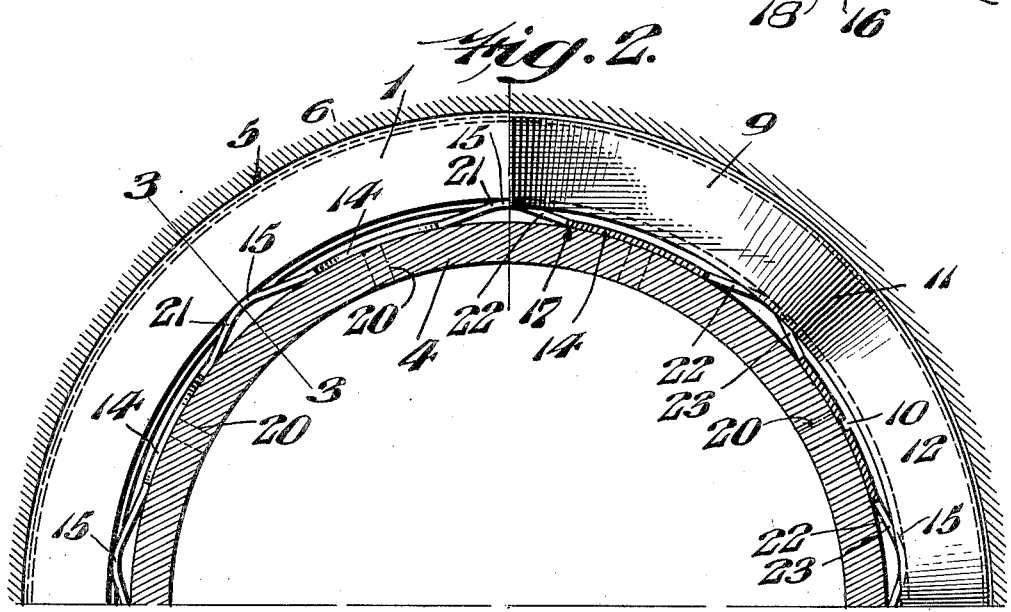
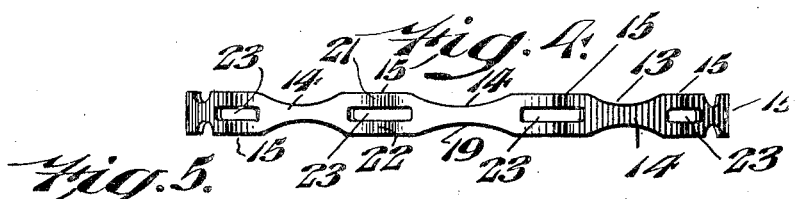
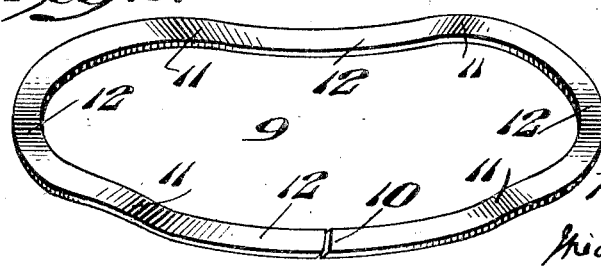
INVENTOR:
WILLIAM WUERFEL,
BY
ATTORNEYS.

March 26, 1929. W. WUERFEL 1,707,035
PISTON RING
Filed Feb. 15, 1927   2 Sheets-Sheet 2
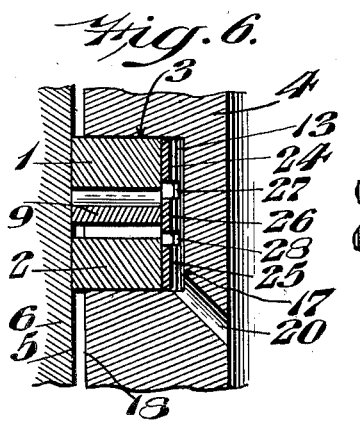
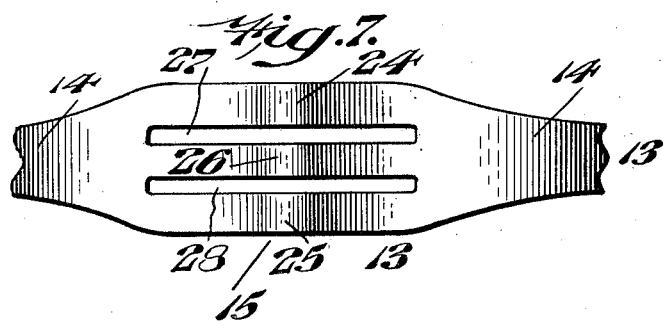
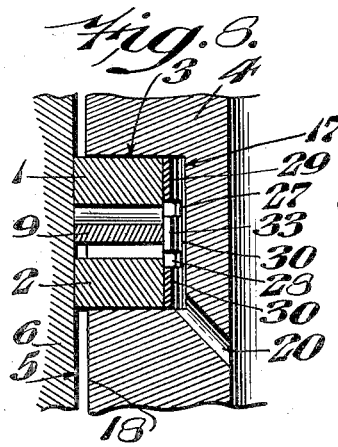
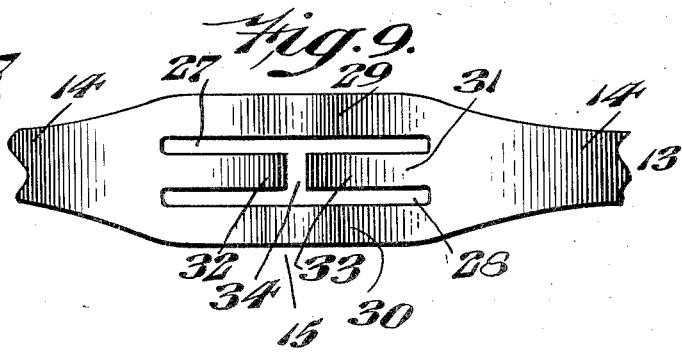
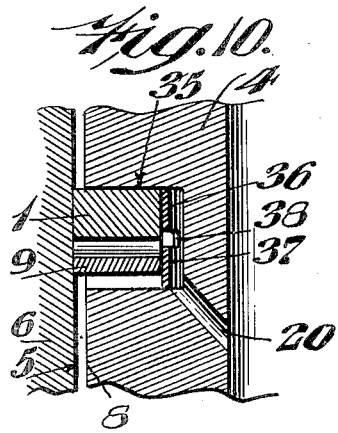
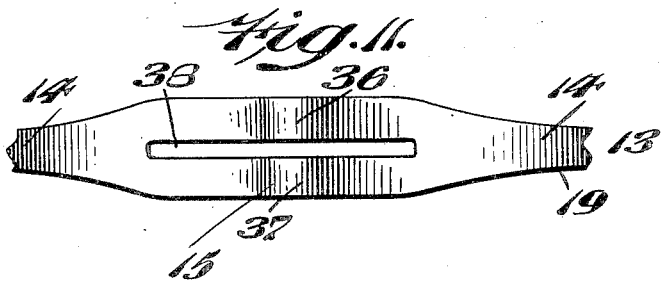
INVENTOR:
WILLIAM WUERFEL,
BY
ATTORNEYS.

Patented Mar. 26, 1929.

1,707,035

UNITED STATES PATENT OFFICE.

WILLIAM WUERFEL, OF PHILADELPHIA, PENNSYLVANIA, ASSIGNOR TO WILKENING MANUFACTURING CO., OF PHILADELPHIA, PENNSYLVANIA, A CORPORATION OF DELAWARE.

PISTON RING.

Application filed February 15, 1927. Serial No. 168,289.

My invention relates to a new and useful composite piston ring for internal combustion engines and the like, and it relates more particularly to a novel, radially and axially expansible piston ring, adapted for use in combination with conventional pistons having standard square peripheral ring grooves, which will form an efficient seal not only against the wall of the cylinder, but against the walls of the piston ring groove as well, thereby not only retaining the pressure of the gas in the pressure or combustion chamber of the engine and minimizing the leakage of said gas from the combustion chamber to the crank case, but also preventing the transfer of the lubricating oil from the crank case to the combustion chamber or preventing what is known as "pumping oil", and the resultant waste of oil and carbonization in the combustion chamber.

My invention further relates to a novel composite radially and axially expansible piston ring, of the character stated, having a maximum flexibility in the two right angular directions of its expansion, and being thereby particularly adapted to form an efficient pressure and oil proof seal not only in cylinders having great piston clearance but also in cylinders worn out of true and having varying diameters due to wear, and being thereby also adapted snugly to fit within, and to form an efficient pressure and oil proof seal with the walls of ring grooves worn large by extensive use.

With the above ends in view, my invention consists of a composite piston ring in combination with a piston having a peripheral ring groove and oil drain holes extending through the wall of said piston into said groove, said piston ring comprising a plurality of separate and independent split cast iron rings, disposed within said ring groove, one of said plurality of cast iron rings being axially or laterally resilient and compressible and having a series of contact areas abutting and engaging the other of said plurality of rings in said groove, thereby axially pressing the latter ring or rings into sealing contact with the side wall or walls of said ring groove.

My invention further consists of novel radially expanding means intermediate of the inner cylindrical wall of the ring groove and said plurality of separate and independent split cast iron rings, for exerting outward radial pressure on one, several or each of said rings, at a series of equidistant points throughout their circumference, thereby to force the same into sealing contact with the cylinder wall; said radially expanding means comprising an annular, integral and flat radial spring member of substantially the width of the ring groove, extending around the bottom of the latter in a many sided polygonal formation or shape, with the sides thereof bearing against the bottom of the ring groove, and with the vertices thereof bearing against the inner peripheries of said plurality of split metallic rings.

My invention consists more particularly in a novel construction in an integral flat radial expander spring of the character stated, wherein each vertex of the flat polygonal expander spring is divided into two or more independently flexible spring contacts by means of a series of longitudinal elongated apertures extending across said vertices, said independently flexible spring contacts being adapted to bear against two or more of the series of radial expansible split metallic rings, thereby to render the radial expansion of the several split metallic rings in the same groove independent of each other and thus to make the piston ring as a whole more flexible. The novel construction in the radial expander spring also includes a series of recesses in the edges of the side of said polygonal shaped spring, adapted to act as passageways for the oil from the ring grooves to the oil drain holes in the inner wall of said groove, thereby to facilitate the drainage of oil from the piston ring groove back into the crank case of the engine.

Thus, my invention also consists of the novel combination with a piston having a ring groove, of a relatively narrow sealing ring or a pair of relatively narrow sealing rings, an axially compressible, reversed, helical spring interposed either between said sealing ring and the wall of the ring groove or between said pair of sealing rings, and of an annular radial expander spring interposed between the inner periphery of said sealing ring or pair of sealing rings, said axially compressible spring member and the bottom of the ring groove, for exerting uniform outward radial pressure upon said sealing ring or pair of sealing rings, and also for exerting pressure upon the axially expanding spring member, if desired; said expander spring having novel means for equalizing not only the outward radial pressure throughout the entire circumference of each sealing ring but also for equalizing the outward radial pressure exerted upon the several individual sealing rings comprising my novel piston ring, and also for imparting a maximum amount of flexibility to a composite piston ring of this character.

For the purpose of illustrating my invention, I have shown in the accompanying drawings, forms thereof, which are at present preferred by me since they will give in practice, satisfactory and reliable results, although it is to be understood that the various instrumentalities of which my invention consists can be variously arranged and organized and that my invention is not limited to the precise arrangement and organization of these instrumentalities as herein shown and described.

In the accompanying drawings, illustrating my invention, in which like reference characters indicate like parts, Figure 1 represents a side elevation of a portion of a piston having mounted in a ring groove thereof a composite piston ring embodying my invention.

Figure 2 represents a horizontal section on line 2—2 of Figure 1, on a greatly enlarged scale.

Figure 3 represents a vertical section on line 3—3 of Figure 2, on a similarly enlarged scale.

Figure 4 represents a side elevation of a radial expander spring embodying my invention, shown on a reduced scale.

Figure 5 represents a perspective view of a laterally or axially expansible spring forming part of the novel composite piston ring embodying my invention.

Figure 6 represents a vertical section similar to that shown in Figure 3, illustrating a modified construction embodying my invention.

Figure 7 represents a fragmentary elevation of a radial expansive spring embodying my invention, of a modified construction shown in section in Figure 6.

Figure 8 represents a vertical section, similar to that shown in Figures 3 and 6 illustrating a further modified construction embodying my invention.

Figure 9 represents a fragmentary view in elevation of the radial expander spring of the modified construction shown in Figure 8.

Figure 10 represents a vertical section similar to that shown in Figure 6, illustrating a still further modified construction embodying my invention.

Figure 11 represents a fragmentary view in elevation of the radial expander spring of the modified construction shown in Figure 10.

The novel composite piston ring of my invention comprises two or three radially expansible rings disposed within a single piston ring groove of the conventional construction, one, two or all of which may contact with the cylinder wall, thus forming sealing rings; one of said rings being also axially or laterally compressible and being interposed between the other two sealing rings or being interposed between the other single sealing ring and the opposed wall of the piston ring groove. The composite piston ring of my invention also comprises a radial expander spring interposed between the inner periphery of the sealing rings and the bottom of or inner wall of the piston ring groove.

In the illustration of my invention shown in Figures 1 to 9 inclusive, the composite piston ring comprises two similar and relatively narrow sealing rings 1 and 2 respectively, separated from each other a suitable distance, disposed within a piston ring groove 3 in the wall of the piston 4 and adapted to form a fluid tight contact with the inner cylindrical wall 5 of the cylinder 6.

The sealing rings 1 and 2 are preferably of suitable cast iron and are split at points 7 and 8 respectively, said points 7 and 8 being preferably staggered. In order to prevent leakage behind the sealing rings, a flat annular and axially or laterally compressible spring 9 is interposed between the two sealing rings 1 and 2, as shown in Figures 1 and 3, preferably made of the same material as the sealing rings 1 and 2, and having a suitable number of alternately reversed helical formations therein, as shown in Figure 5, and being also split at 10, to permit the radial expansion thereof. By this means the two sealing rings 1 and 2, are forced apart with a constant and uniform lateral or axial pressure, exerted upon them by the intermediate spring member 9, at a series of alternate and staggered contact points 11 and 12 respectively. The number of opposed contact points 11 and 12 may be varied. Thus, in the particular illustration of the annular spring member 9 shown in Figure 5, a series of four opposed staggered contact points 11 and 12 are shown, the points 11 bearing against the upper sealing ring 1, while the lower contact points 12 bear against the lower sealing ring 2.

While the sealing rings 1 and 2 may be suitably tensioned so as to exert outward radial pressure inherent in the sealing rings themselves, yet, in order to increase the outward radial force or contact pressure of the sealing rings 1 and 2, and thus to expand the sealing rings 1 and 2 against the inner surface 5 of the engine cylinder 6 with a maximum amount of flexibility, so as to follow any slight irregularities in the cylinder wall, a novel flat annular radial expander spring 13 is provided, made of any suitable spring material such as spring steel or the like, and of generally polygonal form, having the sides 14. The radial expander spring 13 is of a width snugly to fit within the groove 3 of the piston 4, as shown in Figure 3. The vertices 15 form contact points which bear against the inner peripheral surfaces 16 of the sealing rings 1 and 2, while the sides 14 of the polygonal shaped expander spring 13, bear against the bottom or inner cylindrical wall 17 of the ring groove or channel 3 of the piston.

In order to effect a positive draining of the oil from between the cylinder wall 5 and the piston wall 18, back into the crank case of the engine, I provide a suitable series of recesses 19 in each of the sides 14 of the polygonal shaped, radial expander spring 13, of any suitable contour, such as that shown in Figure 4, so that the oil which is scraped from the cylinder wall by means of the sealing rings 1 and 2, and which enters the open spaces between the sealing rings and the lateral expander spring 9, may pass the radial expander spring freely, to the series of drain holes 20, which extend through the piston wall, thereby to permit a free drainage of oil from the piston ring groove 3 into the crank case.

In order to render the expansion or contraction of the sealing rings 1 and 2 (Figure 3) substantially independent of each other, and in order also to equalize the outward radial pressure upon the plurality of separate sealing rings 1 and 2, each vertex 15 of the radial expander spring 13 is divided into two partially independent spring contacts 21 and 22 respectively, by means of the elongated longitudinal apertures 23, each spring contact 21 and 22 being adapted to bear separately against the corresponding sealing ring, thereby to urge said sealing rings outwardly in a radial direction and with equal pressure not only throughout their periphery but equally between the two separate and independent sealing rings, so as to render the outward radial expansion of the piston ring flexible and to permit the two or more separate sealing rings of a piston ring of this composite structure, to follow accurately any slight irregularities or the slightly varying diameters of the cylinder wall, with a maximum of freedom.

In Figures 1 to 4 inclusive of the drawings, I have illustrated an embodiment of my invention, in which each vertex 15 of the radial expander spring 13 is divided into two spring contacts by means of the elongated longitudinal apertures 23. In this modification of my invention only the two outer rings 1 and 2 act as sealing members against the cylinder wall. Hence in this modification of my invention the elongated apertures 23 are of a width and length sufficient to clear the intermediate reversed helical, lateral, or axial expander spring 9, so as to retain said axial expander spring 9 in its normal radial condition indicated in Figure 3, that is, out of contact with the cylinder wall 5.

In Figures 6 and 7 of the accompanying drawings, I have illustrated a modified embodiment, in which not only the two outer rings 1 and 2 are expanded in an outward radial direction, by means of the radial expander spring 13, into sealing contact with the cylinder wall 5, but in which the reversed helical lateral or axial expander spring 9 is also expanded in a radial outward direction into sealing contact with the cylinder wall 5 thereby to increase the sealing action between the piston and cylinder wall and thus to increase the pressure retaining ability of the piston ring as a whole.

In this modified construction embodying my invention, each vertex 15 of the radial expander spring 13 is divided into three partially independent spring contacts 24, 25 and 26 respectively, by the relatively narrow longitudinal apertures 27 and 28. These narrow apertures 27 and 28 are of a width merely sufficient to clear each of the adjacent split metallic rings, 1, 2 and 9, respectively.

In Figures 8 and 9 of the drawings, I have illustrated a further modified embodiment of my invention, in which each vertex 15 is similarly divided into three partially independent and separately flexible spring contact members 29, 30 and 31 respectively each adapted yieldably to bear against the corresponding split metallic rings 1, 2 and 9 respectively, in which the intermediate spring contact 31 however, is further divided into two separate and also independently flexible spring contact members, or tongues 32 and 33, by means of an opening 34 interconnecting the two elongated apertures 27 and 28; each of said spring contacts or tongues 32 and 33 being adapted to bear outwardly against the intermediate lateral or axial expander spring 9, thereby further to increase the flexibility or expansion of said intermediate lateral expander spring 9, and thereby also to increase the flexibility of the radial expander 13 and of the piston ring as a whole.

In Figures 10 and 11 I have illustrated still a further embodiment of my invention which is particularly adapted for the relatively narrow piston ring groove 5, as for instance an eighth of an inch groove, frequently employed in engines, particularly high speed engines. In this embodiment of my invention, only two split metallic rings 1 and 9 are employed, the former acting merely as a sealing ring, and the latter acting both as a sealing ring, as well as a lateral or axial spring member, acting upon the former ring 1 to maintain the same in sealing contact with the contiguous wall of the ring groove 35. In this embodiment of my invention the radial expander spring 13 is correspondingly narrower and the vertices 15 thereof are divided merely into two partially independent or separate spring contact members 36 and 37, by means of the single elongated, longitudinal apertures 38; said elongated apertures 38 being merely of a width sufficient to clear the adjacent edges of the two rings 1 and 9.

It will be seen from the foregoing that by the novel combination of the composite or "multi-ring," laterally or axially expansible piston ring with the integral flat polygonal radial expander spring, of the novel construction hereinabove described, a maximum amount of flexibility is obtainable in the radial expansion or contraction of the piston ring, thus adapting this composite piston ring of my novel construction to cylinders badly worn and out of true cylindrical shape. By the separation of the spring contact points or vertices 15 of the polygonal radial expander spring 13, into the independently flexible spring contact points or members, by means of the elongated longitudinal apertures extending across said vertices, not only is the outward radial pressure upon the several separate sealing rings of my novel composite ring equalized, but said several separate rings are capable of independent outward or inward radial expansion or contraction, thereby independently and freely to follow any slight cylinder wall irregularities and thereby to insure a perfect pressure proof seal between piston and cylinder walls at all times regardless of any irregularity or wear in the cylinder wall.

Moreover, by the recesses 19 in the edges of the sides of the novel polygonal radial expander spring 13, not only is a free passage provided for the drainage of oil through the ring grooves into the drain holes 20, so as to control the oil, but the flexibility and equalization of the radial expander spring is further increased due to a reduction in the contact surfaces or areas between the sides 14 of the spring 13 and the inner cylindrical wall 17 of piston ring groove.

It will be seen moreover, that by forming the plurality of superimposed split metallic rings, of my composite piston ring, of cast iron or bearing metal, it is possible to utilize not only the two outermost rings 1 and 2 as sealing rings against the cylinder wall, but it is also possible to utilize the axial spring member as a sealing ring. Furthermore, by forming the intermediate axial spring member 9 of cast iron or bearing metal, it is possible to employ such annular spring member without in any way encasing the same to prevent the contact of the same with the wall, as would be necessary if said axial expander spring 9 were formed of steel or any other resilient metal not having the bearing qualities such as cast iron possesses. Thus, whether the axial expander spring 9 is expanded or forced outwardly into contact with the cylinder wall as shown in Figures 6, 8 and 10, or whether said spring is left in its original or unexpanded condition, it will not injure the cylinder wall in any way.

Thus also, while in the illustrations shown in the drawings, the rings 1 and 2, as well as the spring 9 may be expanded outwardly by means of the radial expander spring 13, it is to be understood that outward peripheral tension may be imparted to the sealing rings by any suitable means, so as to cause the same to expand against the cylinder wall without the aid of the radial expander spring 13. The novel composite piston ring of my invention, including a plurality of superimposed cast iron rings, each having outward peripheral or radial tension inherent in the metal of the ring, and one of said rings being laterally or axially compressible as well, and without the radial expander spring 13, is particularly adapted for use in original installations, that is, in new engine cylinders, or cylinders not much worn or out of true cylindrical shape.

Thus, for use either in new engines or in cylinders not much worn or out of shape or out of true, either the rings 1, 2 and 9 or merely the rings 1 and 9 may be employed, without the spring 13; each of said rings 1, 2 and 9 being suitably tensioned by any desired means, so as to function as a sealing ring without the aid of the expander 13.

While the use of an axially and radially expansible spring 9 formed of cast iron or bearing metal, in a composite or built up piston ring of this character, is advantageous over the use of a similar lateral or axial expander spring of steel or the like, said axially and radially expansible cast iron spring 9 is of particular advantage for use in connection with relatively narrow composite piston rings of this character, as shown in Figure 10. Thus, due to the bearing qualities inherent in the cast iron spring 9, the latter may be also employed as a sealing ring, where the ring groove is too narrow to accommodate a combination of three rings, so that none of the effective or sealing width of the composite piston ring need be sacrificed for the axial expander spring 9.

Having thus described my invention, what I claim as new and desire to secure by Letters Patent is:—

1. A device of the character stated, comprising a flat metallic spring of generally polygonal shape, having apertures extending across the vertices thereof, dividing the latter into independently flexible spring contact members, and having the side portions thereof weakened.

2. In a device of the character stated, an annular, radial expander spring of generally polygonal shape having elongated longitudinal apertures extending across the vertices thereof, dividing the latter into a plurality of independently flexible spring contact members, and having recesses in the sides thereof to render said spring more flexible and to form oil passages therethrough.

3. In combination with a piston having a peripheral groove and an oil drain hole extending through the inner wall of said groove, of a composite piston ring comprising a plurality of radially expansible split metallic rings superimposed upon each other within said groove and a radial expander spring intermediate of the inner peripheries of said superimposed radially expansible rings and the inner wall of said ring groove, having a series of integral and independently flexible spring contacts bearing against the corresponding radially expansible rings, urging the same outwardly in a radial direction independently of each other and with substantially uniform force throughout their peripheries; said radial expander spring having radial oil passages therethrough.

4. The combination with a piston having a peripheral groove and an oil drain hole extending through the inner wall of said groove, of a composite piston ring comprising a plurality of radially expansible split metallic rings superimposed upon each other in said grooves, one of said plurality of superimposed rings being axially compressible and resilient and bearing against and yieldably urging the other of said plurality of rings into sealing contact with the contiguous wall of the ring groove, a radial expander spring intermediate of the inner peripheries of said superimposed radially expansible rings and the inner wall of said ring groove, having a series of peripherally spaced sets of independently flexible spring contact members bearing against the corresponding radially expansible rings, yieldably to urge the latter outwardly substantially independently of each other and with substantially uniform force throughout their peripheries; said radial expander spring having radial oil passages therethrough.

5. In a device of the character stated, an annular, radial expander spring of generally polygonal shape, formed of a relatively thin and resilient metal having elongated longitudinal apertures extending across the vertices thereof, dividing the latter into sets of independently flexible radial spring contact members, and having recesses in the sides thereof to render said spring more flexible and to form oil passages therethrough.

6. A composite piston ring comprising a plurality of radially expansible split metallic rings superimposed upon each other, one of said plurality of superimposed rings being axially compressible and bearing against and yieldably urging the other of said plurality of rings into sealing contact with a juxtaposed wall, and a flat annular spring member within the inner peripheries of said superimposed radially expansible rings, having a series of peripherally spaced sets of independently flexible radially acting spring contact members bearing against the corresponding radially expansible rings, yieldably to urge the latter outwardly, substantially independently of each other and having weakened portions intermediate said contact members thereof.

7. The combination with a piston having a peripheral groove, of a composite piston ring, comprising a pair of opposed split metallic piston rings superimposed upon each other within said groove, an axially compressible annular spring intermediate of said two opposed sealing rings, urging the latter in opposed axial directions into sealing contact with the contiguous walls of the ring groove and an annular radial expander spring intermediate of the inner periphery of said rings and the inner wall of said groove, having a series of integral and peripherally spaced sets of independently flexible spring contacts, corresponding to the opposed sealing rings and adapted to urge the latter in an outward radial direction, and having clearance apertures intermediate of each set of spring contacts corresponding to and adapted to receive said intermediate axial spring member.

8. The combination with a piston having a peripheral groove therein, of a composite piston ring comprising a pair of opposed split metallic sealing rings superimposed upon each other in said groove an axially compressible and resilient, split, annular, sealing spring member intermediate of said opposed sealing rings, adapted to urge the latter in opposed axial directions into sealing contact with the contiguous walls of the ring groove and an annular radial expander spring of generally polygonal shape, intermediate of the inner peripheries of said rings, and the inner wall of said groove, having sets of independently flexible spring contacts at the vertices thereof, corresponding to said three rings, by pairs of longitudinal apertures extending across said vertices, said independently flexible spring contacts being adapted yieldably to urge the corresponding rings in an outward radial direction, substantially independently of each other.

9. The combination with a piston having a peripheral groove therein, of a composite piston ring comprising a pair of opposed split metallic sealing rings superimposed upon each other in said groove, an annular split metallic sealing spring member intermediate of said two opposed sealing rings, adapted to urge the latter in opposed axial directions, into sealing contact with the contiguous walls of the ring groove, and an annular radial expander spring of generally polygonal shape, intermediate of the inner peripheries of said rings, and the inner wall of said groove, having pairs of longitudinal apertures extending across the vertices thereof, dividing the latter into three independently flexible spring contact sections, and having a transverse recess interconnecting the pair of longitudinal recesses, dividing the central spring member into a pair of independently flexible spring tongues.

10. The combination with a piston having a peripheral groove, of a composite piston ring comprising a pair of split metallic sealing rings superimposed upon each other in said groove, one of said pair of split metallic sealing rings, having a series of alternately reversed helical formation therein, parallel to the axis thereof, being axially resilient and compressible, and urging the other of said pair of sealing rings in an axial direction into sealing contact with the contiguous wall of the ring groove, and an annular radial expander spring intermediate of said periphery of said rings and the inner wall of said groove, having peripherally spaced sets of integral and independently flexible spring contacts, corresponding to the two sealing rings and urging the latter in an outward radial direction.

11. The combination with a piston having an annular groove, of a composite piston ring comprising a plurality of radially expansible, split, metallic packing rings within said groove, an axially resilient corrugated cast-iron split ring intermediate said plurality of radially expansible, split, metallic packing rings, yieldably urging each of said plurality of split, metallic packing rings into sealing contact with the contiguous wall of the groove, and a corrugated ribbon expander intermediate the bottom of the groove and said plurality of radially expansible, split, metallic packing rings, exerting distributed outward radial pressure thereon.

12. The combination with a piston having a peripheral groove, of a composite piston ring comprising a plurality of radially expansible, split, cast-iron rings within said groove, one of said plurality of split, cast-iron rings being corrugated and axially resilient and yieldably urging the other of said plurality of split, cast-iron rings into sealing contact with the contiguous wall of the groove, and a corrugated ribbon expander intermediate the bottom of the groove and said plurality of radially expansible split, cast-iron rings, exerting distributed outward radial pressure on a plurality of said rings.

WILLIAM WUERFEL.